(12) United States Patent
Choi

(10) Patent No.: US 9,130,221 B2
(45) Date of Patent: Sep. 8, 2015

(54) SQUEEZE PIN AND SECONDARY BATTERY USING THE SAME

(75) Inventor: Bum-Kuk Choi, Suwon-si (KR)

(73) Assignee: SAMSUNG SDI CO., LTD., Suwon-si, Gyeonggi-do (KR)

(*) Notice: Subject to any disclaimer, the term of this patent is extended or adjusted under 35 U.S.C. 154(b) by 1932 days.

(21) Appl. No.: 12/275,371

(22) Filed: Nov. 21, 2008

(65) Prior Publication Data

US 2009/0176155 A1    Jul. 9, 2009

(30) Foreign Application Priority Data

Jan. 4, 2008   (KR) ................. 10-2008-0001354

(51) Int. Cl.
| H01M 2/30 | (2006.01) |
|---|---|
| H01M 2/26 | (2006.01) |
| H01M 2/02 | (2006.01) |
| H01M 2/20 | (2006.01) |
| H01M 4/00 | (2006.01) |
| H01R 4/48 | (2006.01) |
| H01M 2/22 | (2006.01) |
| H01M 10/42 | (2006.01) |
| H01R 13/115 | (2006.01) |
| H01R 13/03 | (2006.01) |

(52) U.S. Cl.
CPC ............. *H01M 2/22* (2013.01); *H01M 2/021* (2013.01); *H01M 2/26* (2013.01); *H01M 10/425* (2013.01); *H01R 13/115* (2013.01); *H01M 2200/00* (2013.01); *H01R 13/03* (2013.01)

(58) Field of Classification Search
None
See application file for complete search history.

(56) References Cited

U.S. PATENT DOCUMENTS

| 2002/0045377 A1* | 4/2002 | Okayasu et al. ............ 439/378 |
| 2005/0142439 A1* | 6/2005 | Lee et al. .................... 429/163 |

FOREIGN PATENT DOCUMENTS

| JP | 8-153505 | 6/1996 | |
|---|---|---|---|
| JP | 2002-313311 | * 10/2002 | ............ H01M 2/26 |
| JP | 2002-313311 A | 10/2002 | |
| JP | 2006-12802 | 1/2006 | |
| KR | 10-1999-0000974 A | 1/1999 | |
| KR | 2005-36630 | 4/2005 | |
| KR | 10-0571270 | 4/2006 | |

(Continued)

OTHER PUBLICATIONS

English translation of JP 2002-313311.*

(Continued)

*Primary Examiner* — Yoshitoshi Takeuchi
(74) *Attorney, Agent, or Firm* — Knobbe Martens Olson & Bear LLP

(57) ABSTRACT

A squeeze pin and a secondary battery using the same improve the coupling intensity of an electrode tab and a lead terminal, prevent damage of a protection circuit module, and reduce the cost. The secondary battery includes an outer case; an electrode assembly accommodated in the outer case and including a positive electrode plate connected to a positive electrode tab, a negative electrode plate connected to a negative electrode tab, and a separator; a protective circuit board including first and second connection terminals; and a first lead terminal connecting the positive electrode tab to the first connection terminal and a second lead terminal connecting the negative electrode tab to the second connection terminal, wherein at least one of the first lead terminal and the positive electrode tab, or the second lead terminal and the negative electrode tab are physically electrically connected to each other.

6 Claims, 4 Drawing Sheets

(56) References Cited

FOREIGN PATENT DOCUMENTS

| KR | 10-0635743 | 10/2006 |
| KR | 2007-56494 | 6/2007 |

OTHER PUBLICATIONS

Abstract of KR 10-2006-0028182.
Korean Office Action dated Feb. 2, 2010, issued in corresponding Korean Patent Application No. 10-2009-0116800.
Korean Office Action dated Mar. 11, 2010, issued in corresponding Korean Patent Application No. 10-2008-0001354.
KIPO Notice of Allowance dated Aug. 6, 2010 for Korean Application No. 9-5-2010-034299318.
KIPO Notice of Allowance dated Aug. 6, 2010 for Korean Application No. 9-5-2010-034298924.
Chinese Office Action for Chinese Patent Application No. 200810189408.2, 13 pages, dated Oct. 20, 2010.

* cited by examiner

SQUEEZE PIN AND SECONDARY BATTERY USING THE SAME

CROSS-REFERENCE TO RELATED APPLICATIONS

This application claims benefit of Korean Patent Application No. 2008-1354, filed Jan. 4, 2008, the disclosure of which is incorporated herein by reference.

BACKGROUND OF THE INVENTION

1. Field of the Invention

Aspects of the present invention relate to a secondary battery, and more particularly, to a squeeze pin, and a secondary battery using the same, that improves the coupling intensity of an electrode tab and a lead terminal, prevents the damage of a protection circuit module, and reduces the cost.

2. Description of the Related Art

Portable electronic devices, such as mobile phones, camcorders, PDAs, and the like, have been actively developed and produced. Accordingly, users have increasingly demanded that the portable electronic devices should be light, small, and mobile. Specifically, to operate the portable electronic devices in the places where there are provided no sources of electricity, rechargeable secondary batteries having a high energy density as the source of electricity are used. Therefore, the power supply time, size, weight, and the like of the secondary batteries are considered as being very important in determining the portability and mobility of the portable electronic device.

Examples of secondary batteries include nickel zinc batteries, nickel cadmium batteries, nickel metal hydride batteries, lithium secondary batteries, and the like. Among these batteries, lithium secondary batteries having a high operating voltage and a high energy density per unit weight are widely used. A lithium secondary battery is made by sealing an electrode assembly and an electrolyte in an outer case formed of a material, such as aluminum and the like.

Lithium secondary batteries are classified as a cylinder type, a prismatic type, and a pouch type, depending on the shapes of the outer case. Further, lithium secondary batteries are classified as lithium ion batteries and lithium polymer batteries, depending on the electrolyte used therein.

A secondary battery includes a protective circuit board on which a protection circuit is mounted to prevent an accident caused by over-charging, over-discharging, over-current, and the like.

In a pouch-type secondary battery, after an electrode assembly formed by winding a positive electrode plate, a negative electrode plate, and a separator is sealed in the pouch-type case, the secondary battery is connected to the protective circuit board.

Then, a positive electrode tab connected to the positive electrode plate and a negative electrode tab connected to the negative electrode plate, both tabs protruding outward from one side of the pouch-type case, are connected to their corresponding electrical terminals of the protective circuit board, typically using lead plates.

In general, methods, such as ultrasonic welding, resistance welding, laser welding and the like, are used to connect the lead plate to the electrode tab. However, in the laser welding method, the equipment is expensive and difficult to maintain because replacement components are also expensive. In the resistance welding method, its use range is narrow and it is difficult to be applied to an aluminum material. Moreover, the reliability of a welded part is low after the resistance welding is performed. Further, in the ultrasonic welding, its quality variation is large, and a protection circuit module is likely to be damaged by ultrasonic vibrations generated during the welding process.

SUMMARY OF THE INVENTION

Aspects of the present invention provide a squeeze pin which improves the coupling intensity of an electrode tab and a lead terminal, prevents the damage of a protection circuit module, and reduces the cost, and a secondary battery using the same.

Aspects of the present invention provide a secondary battery comprising: an outer case; an electrode assembly accommodated in the outer case and including a positive electrode plate connected to a positive electrode tab, a negative electrode plate connected to a negative electrode tab, and a separator; a protective circuit board including first and second connection terminals; and a first lead terminal connecting the positive electrode tab to the first connection terminal and a second lead terminal connecting the negative electrode tab to the second connection terminal, wherein the first lead terminal and the positive electrode tab are physically and electrically connected, or the second lead terminal and the negative electrode tab are physically and electrically connected.

According to aspects of the present invention, the first lead terminal and the positive electrode tab or the second lead terminal and the negative electrode tab may be connected to each other by a squeeze pin.

According to aspects of the present invention, the squeeze pin may comprise: a supporting part; pressurizing parts extended from both ends of the supporting part to form a space between the supporting part and the pressurizing parts.

According to aspects of the present invention, the first lead terminal and the positive electrode tab or the second lead terminal and the negative electrode tab may be stacked within the space of the squeeze pin.

Aspects of the present invention provide a secondary battery comprising: an outer case; an electrode assembly accommodated in the outer case and formed of a positive electrode plate connected to a positive electrode tab, a negative electrode plate connected to a negative electrode tab, and a separator; a protective circuit board including first and second connection terminals; and a first lead terminal connecting the positive electrode tab to the first connection terminal and a second lead terminal connecting the negative electrode tab to the second connection terminal, wherein at least one of the first lead terminal and the second lead terminal is formed in a 'T' shape.

According to aspects of the present invention, the first or second lead terminal may comprise: a connection part formed to be extended in a lengthwise direction; and a pressurizing part formed by extending one end of the connection part in both directions (in a widthwise direction) to be perpendicular to the lengthwise direction of the connection part.

According to aspects of the present invention, the one end of the connection part may be one end of the first lead tab connected to the positive electrode tab or one end of the second lead tab connected to the negative electrode tab.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
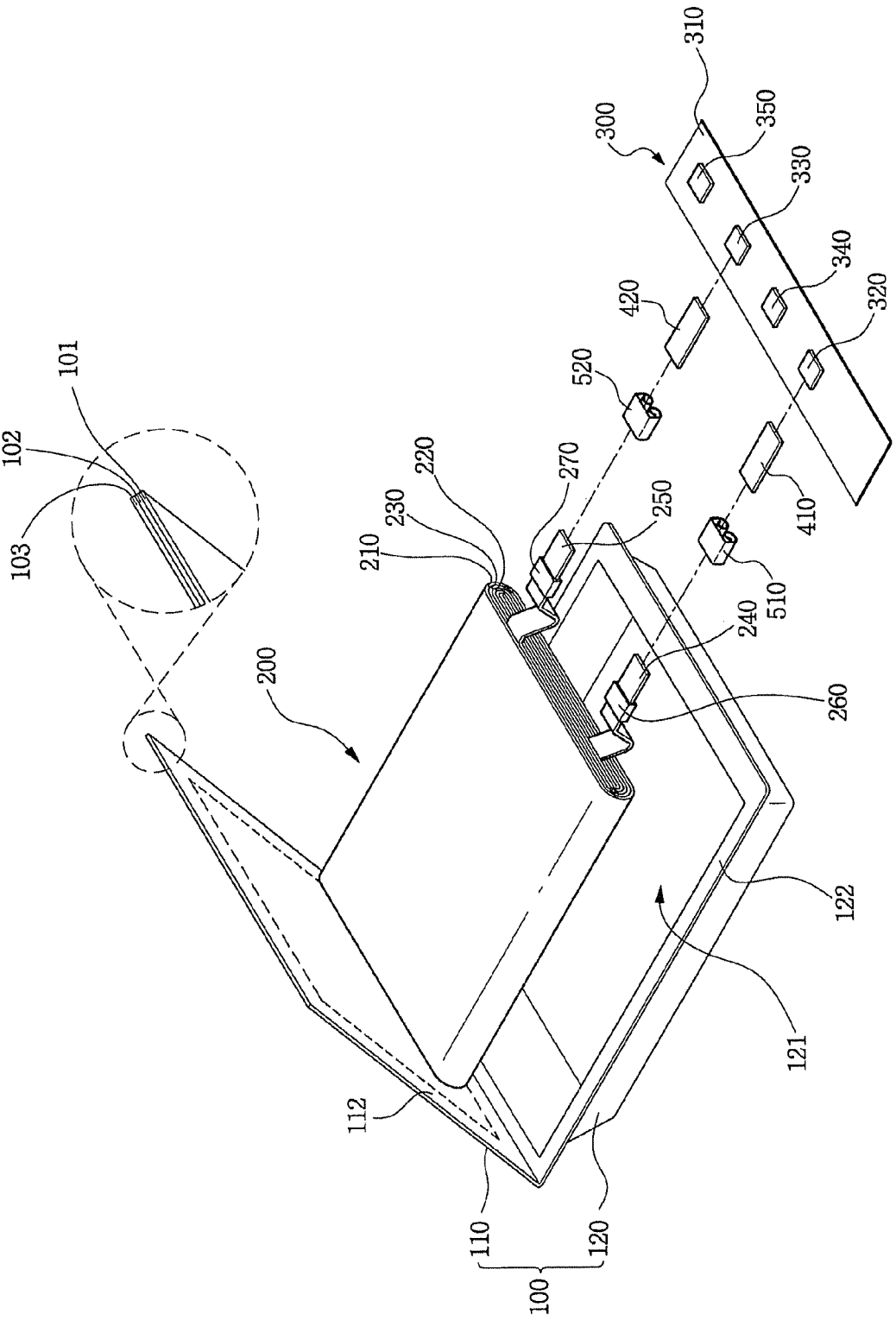
FIG. 1A is an exploded perspective view of a secondary battery according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of present invention by referring to the figures. In the drawings, the thickness and length of layers and regions are exaggerated for clarity. It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Figure 1B:
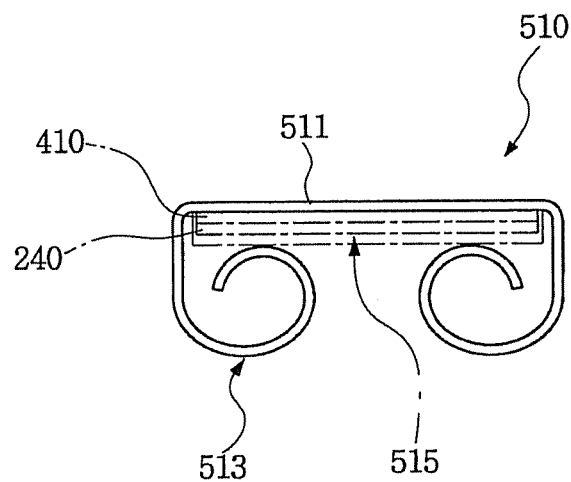
FIGS. 1B and 1C illustrate examples of a squeeze pin illustrated in FIG. 1A.
Figure 1C:
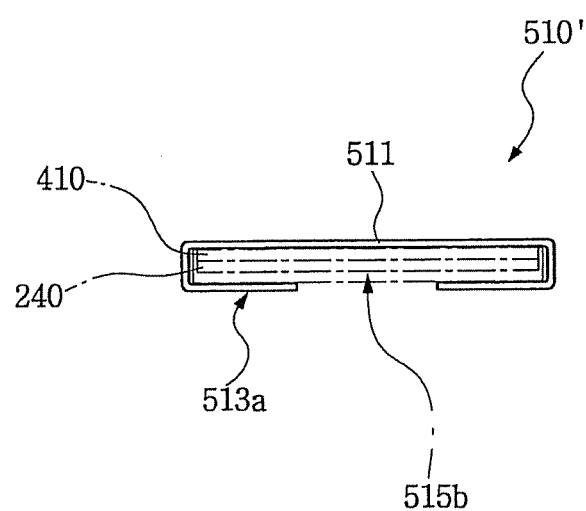

FIG. 1A is an exploded perspective view of a secondary battery according to an exemplary embodiment of the present invention, and FIGS. 1B and 1C illustrate examples of a squeeze pin illustrated in FIG. 1A. In the secondary battery of FIG. 1A, after an outer case 100 comprising an upper case 110 and a lower case 120 receives an electrode assembly 200, the outer case 100 is sealed, and a bare cell is formed.

The upper case 110 and the lower case 120 are connected to each other at one side edge of their respective sides as shown. The other sides of the upper case 110 and the lower case 120 are open so as to accommodate the electrode assembly 200. In any one of the upper case 110 and the lower case 120, an accommodation part 121 to accommodate the electrode assembly 200 is formed by a press process and the like. In this exemplary embodiment, the accommodation part 121 is formed in the lower case 120.

A lower sealing part 122 is formed at an edge of the lower case 120, along the accommodation part 121. An upper sealing part 112 corresponding to the lower sealing part 122 is formed in the upper case 110. The upper sealing part 112 and the lower sealing part 122 provide sealing surfaces to seal the outer case 100 by thermal bonding and the like.

The outer case 100 has a multilayer structure including a thermal bonding layer 101, a metal layer 102, and an insulating layer 103. The thermal bonding layer 101 is a sealing material having thermal bonding properties. The metal layer 102 maintains mechanical strength and blocks moisture and oxygen from entering the sealed outer case 100.

In the outer case 100, the thermal bonding layer 101 is formed at one side of the metal layer 102 and the insulating layer 103 is formed at the other side of the metal layer 102, opposing the side at which the thermal bonding layer 101 is formed. That is, the thermal bonding layer 101 and the insulating layer 103 are formed so as to oppose to each other about the metal layer 102.

The metal layer 102 may be formed of, generally, aluminum, steel, stainless steel, or the like. However, aspects of the present invention do not limit the material of the metal layer 102.

Further, the thermal bonding layer 101 may be formed of casted polypropylene or the like, and the insulating layer 103 may be formed of polyethylene terephthalate (PET), nylon, or the like. However, aspects of the present invention do not limit the materials of the thermal bonding layer 101 or the insulating layer 103.

The electrode assembly 200 is formed by stacking and winding a positive electrode plate 210, a negative electrode plate 220, and a separator 230 disposed between the positive electrode plate 210 and the negative electrode plate 220 to electrically insulate the positive electrode plate 210 and the negative electrode plate 220 from each other.

The positive electrode plate 210 includes a positive electrode coating portion and a positive electrode non-coating portion. The positive electrode coating portion is formed by applying a positive electrode slurry to a portion of a positive electrode collector formed of a material, such as aluminum and the like, thereby forming the positive electrode non-coating portion in which the positive electrode slurry is not applied. A positive electrode tab 240 having a predetermined length is bonded to the positive electrode non-coating portion. The positive electrode tab 240 is formed to protrude out of the outer case 100 at one side of the outer case 100 when the outer case 100 is sealed.

The negative electrode plate 220 includes a negative electrode coating portion and a negative electrode non-coating portion. The negative electrode coating portion is formed by applying a negative electrode slurry to a portion of a negative electrode collector formed of a material, such as copper and the like, thereby forming the negative electrode non-coating portion in which the negative electrode slurry is not applied. A negative electrode tab 250 having a predetermined length is bonded to the negative electrode non-coating portion. The negative electrode tab 250 is formed to protrude out of the outer case 100 at one side of the outer case 100 when the outer case 100 is sealed.

Further, adhesive tab tapes 260 and 270 may be respectively wound around parts of the positive electrode tab 240 and negative electrode tab 250 that overlap the sealing parts 112 and 122 of the outer case 100 so as to aid sealing of the outer case 100.

The outer case 100 is sealed after the electrode assembly 200 is accommodated therein, thereby forming the bare cell.

The secondary battery including the bare cell includes a protective circuit board 300 to control charging/discharging and prevent malfunction of the bare cell. The protective circuit board 300 is formed by mounting first and second connection terminals 320 and 330, a protection circuit module 340, and positive temperature coefficient (PTC) thermistor 350, and the like at one side of a printed circuit board 310. The first and second connection terminals 320 and 330 are electrically connected to the positive electrode tab 240 and the negative electrode tab 250, respectively.

Further, at another side of the printed circuit board 310, an external connection terminal (not shown) is formed to be electrically connectable to an electronic device which operates by the connection to the battery. However, aspects of the present invention are not limited thereto such that the external connection terminal may be formed on a same side of the printed circuit board 310 as the other components.

The first and second connection terminals 320 and 330 may be formed of nickel having high conductivity, and the like, and be directly connected to the positive electrode tab 240 and negative electrode tab 250. However, in this exemplary embodiment, the first and second connection terminals 320 and 330 are respectively connected to the positive electrode tab 240 and negative electrode tab 250 via first and second lead terminals 410 and 420.

The protection circuit module 340 comprises various protection circuits and electrical devices to control charging/discharging. The protection circuit module 340 may include a charging/discharging field effect transistor (FET) device, a fuse, a temperature sensor, a control unit, a sensor resistor, or other circuits and electrical devices.

The PTC thermistor 350 is a device in which electrical resistance increases when a temperature is over a specific critical value. Therefore, the PTC thermistor 350 stops a charging/discharging current when the battery is at an abnormally high temperature. The PTC thermistor 350 performs a reversible operation. Therefore, when the temperature of the battery decreases after the current is stopped by the operation of the PTC thermistor 350, the resistance of the PTC thermistor 350 again decreases so that the battery can normally operate.

The first lead terminal 410 and the second lead terminal 420 electrically connect the secondary battery of the bare cell type to the protective circuit board 300.

One end of the first lead terminal 410 is connected to the first connection terminal 320 of the protective circuit board 300 and the other end of the first lead terminal 410 is connected to the positive electrode tab 240 or negative electrode tab 250. In this exemplary embodiment, the other end of the first lead terminal 410 is connected to the positive electrode tab 240.

One end of the second lead terminal 420 is connected to the second connection terminal 330 of the protective circuit board 300 and the other end of the second lead terminal 420 is connected to the positive electrode tab 240 or negative electrode tab 250. In this exemplary embodiment, the other end of the second lead terminal 420 is connected to the negative electrode tab 250.

The first lead terminal 410 and the second lead terminal 420 are not connected to the same electrode tab 240 and 250 and are not connected to the same connection terminal 320 and 330. The first and second lead terminals 410 and 420 may be bonded to the first and second connection terminals 320 and 330 by a method such as welding and the like.

The first lead terminal 410 and the second lead terminal 420 are respectively physically connected to the positive electrode tab 240 and the negative electrode tab 250 using a first squeeze pin 510 and a second squeeze pin 520, thereby forming the electrical connection between the positive and negative electrode tabs 240 and 250 and the first and second connection terminals 320 and 330 of the protection circuit board 300. Although illustrated in FIG. 1A as the squeeze pin 510 connecting the positive electrode tab 240 and the first lead terminal 410 and the squeeze pin 520 connecting the negative electrode tab 250 and the second lead terminal 420, aspects of the present invention are not limited thereto such that the only the positive electrode tab 240 and the first lead terminal 410 are connected by the squeeze pin 510, or only the negative electrode tab 250 and the second lead terminal 420 are connected by the squeeze pin 520.

When the electrical connection is physically performed as described above, the electrical connection between the first lead terminal 410 and the positive electrode tab 240 or the second lead terminal 420 and the negative electrode tab 250 is not influenced by the materials thereof. That is, the first lead terminal 410 and the positive electrode tab 240 or the second lead terminal 420 and the negative electrode tab 250 may be formed of a same material or different materials.

As described above, both the first and second squeeze pins 510 and 520 are used. However, only the first squeeze pin 510 to connect the first lead terminal 410 and the positive electrode tab 240 may be used, or only the second squeeze pin 520 to connect the second lead terminal 420 and the negative electrode tab 250 may be used.

The squeeze pins 510 and 520 firmly connect the lead terminals 410 and 420 to the electrode tabs 240 and 250 and may be formed of metal materials, such as steel, aluminum, stainless steel, and the like. Aspects of the present invention do not limit the material of the squeeze pins 510 and 520. Therefore, the squeeze pins 510 and 520 may be formed of any material that firmly connects the terminals 410 and 420 to the electrode tabs 240 and 250.

With reference to FIG. 1B, when a first material, such as the first lead terminal 410, and a second material, such as the positive electrode tab 240, are pressed to be connected together, the first squeeze pin 510 comprises a supporting part 511 having a flat shape to support the first lead terminal 410 and the positive electrode tab 240.

The first squeeze pin 510 further comprises a pressurizing part 513 that forms a space 515 with the supporting part 511. The pressurizing part 513, which pressurizes and presses the first lead terminal 410 and the positive electrode tab 240 against the supporting part 511, are formed by extending at least a portion of the first squeeze pin 510 from one or both sides of the supporting part 511. The space 515 is formed between the supporting part 511 and the pressurizing part 513. The first lead terminal 410 and the positive electrode tab 240 are stacked in the space 515, as shown in FIG. 1B.

Since the first lead terminal 410 and the positive electrode tab 240 are positioned to be stacked in the space 515, preferably, the height of the space 515 may be the same as or greater than the total thickness of the positive electrode tab 240 and the first lead terminal 410 being stacked together.

As illustrated in FIG. 1B, in the first squeeze pin 510, the pressurizing part 513 has a rolled shape. The rolled end may be in contact with the positive electrode tab 240 or the first lead terminal 410 positioned in the space 515. Specifically, the pressurizing part 513 is rolled inwardly toward the space 515 such that an outer surface of the pressurizing part 513 is rolled over to contact the first lead terminal 410 or the positive electrode tab 240 and pressurize and press the first lead terminal 410 and the positive electrode tab 240 toward the supporting part 511. Further, as illustrated in FIG. 1C, a first squeeze pin 510' may be formed in the shape so that a pressurizing part 513a covers a predetermined region including one or both edges of the positive electrode tab 240 or the first lead terminal 410 positioned in a space 515b. Aspects of the present invention do not limit the shape of the squeeze pin 510 and 510' such that one or multiple portions of the support part 511 may be extended and bent or rolled to pressurize and press the first lead terminal 410 and the positive electrode tab 240 together.

FIGS. 1B and 1C illustrate examples of the first squeeze pin 510 but are applied to the second squeeze pin 520, which connects the negative electrode tab 250 to the second lead terminal 420 in the same manner as the first squeeze pin 510 connects the positive electrode tab 250 to the first lead terminal 420.

The secondary battery may further comprise a hard case (not shown) to protect the exterior of the battery. The hard case may be formed of a plastic or an aluminum material. Tubing and labeling may be further performed.

Figure 2:
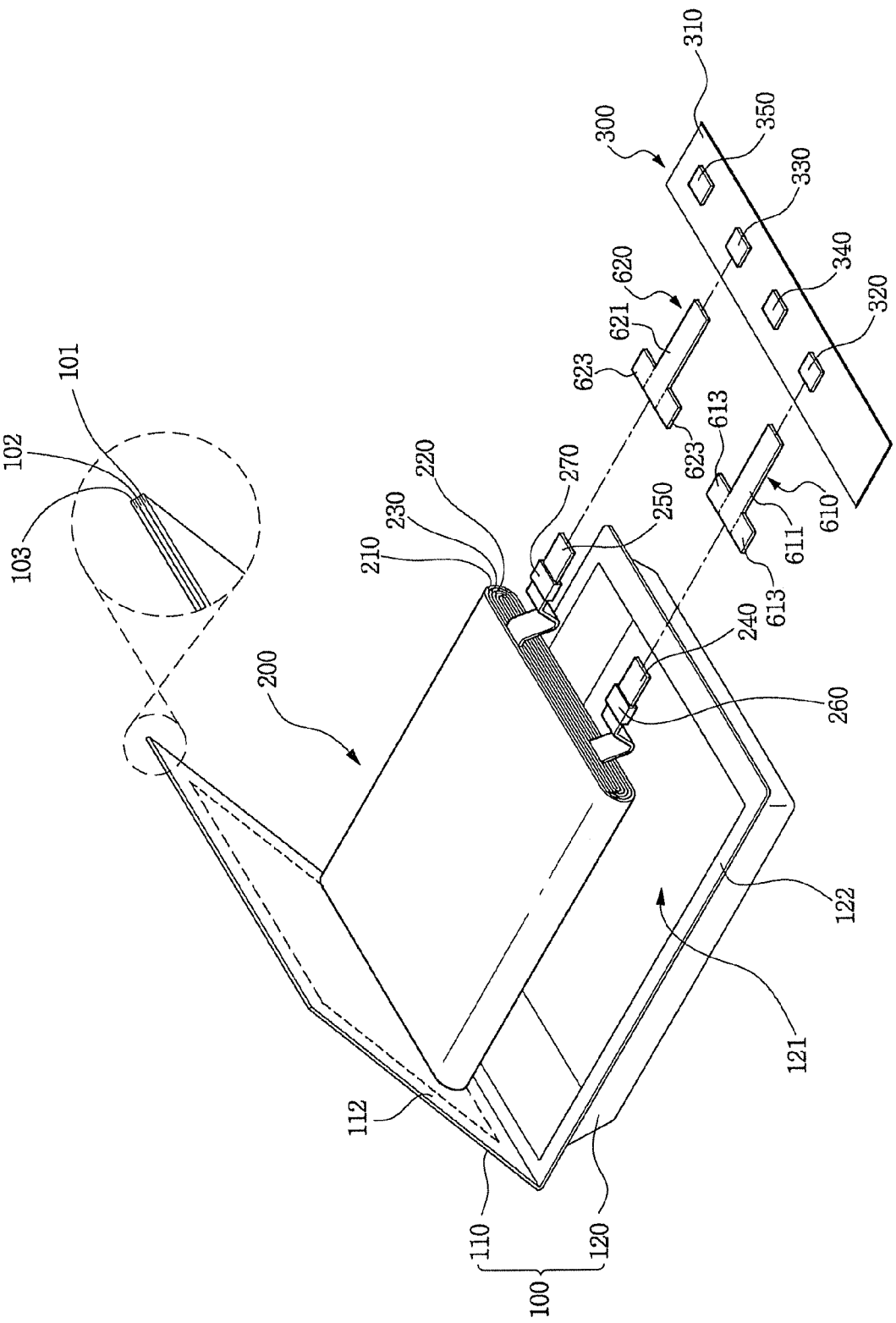
FIG. 2 is an exploded perspective view of a secondary battery according to an exemplary embodiment of the present invention.

FIG. 2 is an exploded perspective view of a secondary battery according to an exemplary embodiment of the present invention. The secondary battery of FIG. 2 will be described, using the same reference numbers for the same elements as those of the secondary battery of FIG. 1A.

In the secondary battery of FIG. 2, an outer case 100 is sealed after the outer case 100 comprising an upper case 110 and a lower case 120 receives an electrode assembly 200, thereby forming a bare cell.

As like reference numerals refer to the like elements, no further description of the elements of FIG. 2 that are similar to those in FIG. 1A will be presented.

After the electrode assembly 200 is accommodated in the outer case 100, the outer case 100 is sealed, thereby forming the bare cell. The secondary battery including the bare cell comprises a protective circuit board 300 to control charging/discharging and prevent malfunction.

First and second lead terminals 610 and 620 electrically connect the secondary battery of the bare cell type to the protective circuit board 300.

One end of the first lead terminal 610 is connected to a first connection terminal 320 of the protective circuit board 300 and the other end of the first lead terminal 610 is connected to a positive electrode tab 240 or a negative electrode tab 250. In this exemplary embodiment, the other end of the first lead terminal 610 is connected to the positive electrode tab 240.

One end of the second lead terminal 620 is connected to a second connection terminal 330 of the protective circuit board 300 and the other end of the second lead terminal 620 is connected to the positive electrode tab 240 or negative electrode tab 250. In this exemplary embodiment, the other end of the second lead terminal 620 is connected to the negative electrode tab 250. The first lead terminal 610 and the second lead terminal 620 are not connected to the same electrode tab and are not connected to the same connection terminal.

The first lead terminal 610 includes a connection part 611 and a pressurizing part 613. The connection part 611 is formed so as to be long in one direction (referred to as the 'lengthwise' direction). The pressurizing part 613 is formed by extending one end of the connection part 611 in both directions (referred to as the 'widthwise' direction) perpendicular to the lengthwise direction of the connection part 611, i.e., to form the crossing part of the 'T' shape. Therefore, the first lead terminal 610 may be formed in a 'T' shape. However, aspects of the present invention do not limit the shape of the first lead terminal 610.

Further, the second lead terminal 620 includes a connection part 621 and a pressurizing part 623. The connection part 621 is formed so as to be long in one direction (referred to as the 'lengthwise' direction). The pressurizing part 623 is formed by extending one end of the connection part 621 to be connected to the negative electrode tab 250 in both directions (referred to as the 'widthwise' direction) perpendicular to the lengthwise direction of the connection part 621. Therefore, the second lead terminal 620 may be formed in the 'T' shape. However, aspects of the present invention do not limit the shape of the second lead terminal 620.

In FIG. 2, both the first and second lead terminals have the 'T' shape. However, only the first lead terminal 610 connected to the positive electrode tab 240 may have the 'T' shape, or only the second lead terminal 620 connected to the negative electrode tab 250 may have the 'T' shape.

The first and second lead terminals 610 and 620 may be bonded to first and second connection terminals 320 and 330 by a method such as welding and the like.

Figure 3A:
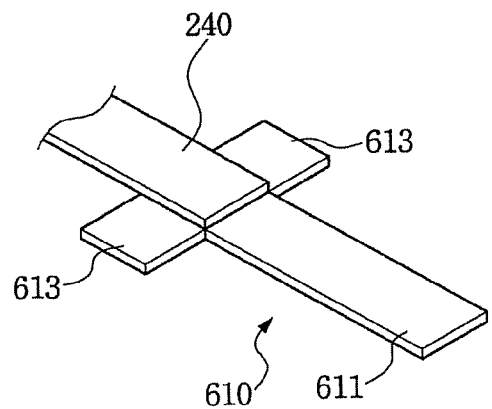
FIG. 3A is a plan view of a positive electrode tab of FIG. 2 being stacked on a connection part of a first lead terminal.
Figure 3B:
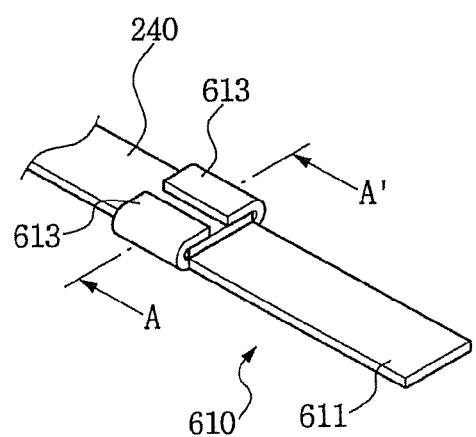
FIG. 3B is a plan view of a pressurizing part of the first lead terminal of FIG. 3A being folded and pressed.
Figure 3C:
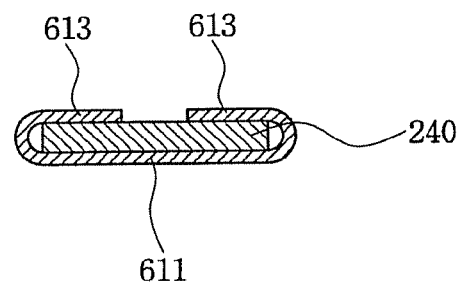
FIG. 3C is a sectional view taken along line A-A' of FIG. 3B.

FIGS. 3A through 3C illustrate the connection structure of the positive electrode tab 240 and the first lead terminal 610. However, these drawings also apply to the connection structure of the negative electrode tab 250 and the second lead terminal 620 in the same manner. Therefore, no drawings for explaining the connection structure of the negative electrode tab 250 and the second lead terminal 620 will be presented.

FIG. 3A is a plan view of the positive electrode tab 240 of FIG. 2 stacked on the connection part 611 of the first lead terminal 610, FIG. 3B is a plan view of the pressurizing part 613 of the first lead terminal 610 of FIG. 3A being folded and pressed, and FIG. 3C is a sectional view taken along line A-A' of FIG. 3B.

With reference to FIGS. 3A through 3C, the first lead terminal 610 and the positive electrode tab 240 are connected such that the positive electrode tab 240 is stacked on the connection part 611 of the first lead terminal 610, and the pressurizing part 613 positioned at both sides of the connection part 611 is folded towards the stacked positive electrode tab 240 and is pressed against the stacked positive electrode tab 240 so as to firmly contact the positive electrode tab 240.

As illustrated in FIG. 3C, the pressed state of the pressurizing part 613 of the first lead terminal 610 about the positive electrode tab 240 may have the shape that the pressurizing part 613 covers a predetermined region including both edges of the positive electrode tab 240. However, aspects of the present invention are not limited thereto.

In the same manner, the second lead terminal 620 and the negative electrode tab 250 may be connected to each other such that the negative electrode tab 250 is stacked on the connection part 621 of the second lead terminal 620, and the pressurizing part 623 positioned at both sides of the connection part 621 is folded towards the stacked negative electrode tab 250 and is pressed against the stacked negative electrode tab 250 so as to firmly contact the negative electrode tab 250.

The pressed pressurizing parts 613 and 623 may have different shapes according to pressing methods. Further, when the pressurizing parts 613 and 623 of the first lead terminal 610 and second lead terminal 620 are folded so as to receive the positive electrode tab 240 and the negative electrode tab 250, the positive electrode tab 240 and the negative electrode tab 250 are inserted into the space formed by the pressurizing parts 613 and 623 and thereafter the pressurizing parts 613 and 623 may be pressed to firmly contact the positive and negative electrode tabs 240 and 250. Further, either or both of the pressurizing parts 613 and 623 may be folded about the positive and negative electrode tabs 240 and 250 similar to the squeeze pin 510 illustrated in FIG. 1A so as to include rolled pressing parts to connect the positive and negative electrode tabs 240 and 250 with the first and second lead terminals 610 and 620. Specifically, the pressurizing parts 613 and 623 may be rolled inwardly toward the positive and negative electrode tabs 240 and 250 such that outer surfaces of the pressurizing parts 613 and 623 are rolled over to contact the positive and negative electrode tabs 240 and 250 and pressurize and press the positive and negative electrode tabs 240 and 250 toward the connection parts 611 and 621 of the first and second lead terminals 610 and 620. As described above, aspects of the present invention do not limit the shape of the first and second lead terminals 610 and 620 such that one or multiple portions of the connection parts 611 and 621 may be extended and bent or rolled to pressurize and press the positive electrode tab 240.

Further, although illustrated as the first and second lead terminals 610 and 620 are described as including the pressurizing parts 613 and 623 and the connection parts 611 and 621 (i.e., the 'T' shape), aspects of the present invention are not limited thereto such that each of the positive and negative electrode tabs 240 and 250 may include the pressurizing parts 613 and 623 and the connection parts 611 and 621 so as to electrically connect the first and second lead terminals 610 and 620 with the positive and negative electrode tabs 240 and 250.

Therefore, the electrical connection between the first lead terminal 610 and the positive electrode tab 240, and the electrical connection between the second lead terminal 620 and the negative electrode tab 250 are physically performed and not connected by welding.

When the electrical connection between the first lead terminal 610 and the positive electrode tab 240 or between the second lead terminal 620 and the negative electrode tab 250 is physically connected, such connections are not influenced by the material thereof. That is, the first lead terminal 610 and the positive electrode tab 240 or the second lead terminal 620 and the negative electrode tab 250 may be formed of the same material or different materials.

The secondary battery may further comprise a hard case (not shown) to protect the exterior of the battery. The hard case may be formed of a plastic or an aluminum material. Tubing and labeling may be further performed.

In accordance with the squeeze pin and the secondary battery using the same according to aspects of the present invention, the coupling intensity between the lead terminal and the electrode tab is improved using inexpensive equipment. Furthermore, since the lead terminal and the electrode tab are not directly welded, the protection circuit module is prevented from being damaged upon welding, and therefore, the electrical safety and reliability are improved. Furthermore, since the squeeze pin is used irrespective of the material of the lead terminal and the electrode tab, any specific welding depending on the material does not need to be performed, and therefore, the operability is increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   (a) an outer case;
   (b) an electrode assembly accommodated in the outer case, the electrode assembly comprising:
      (i) a positive electrode plate connected to a positive electrode tab,
      (ii) a negative electrode plate connected to a negative electrode tab, and
      (iii) a separator disposed between the positive and negative electrode plates;
   (c) a protective circuit board comprising first and second connection terminals;
   (d) a first lead terminal electrically connected to the positive electrode tab to the first connection terminal; and
   (e) a second lead terminal electrically connected to the negative electrode tab to the second connection terminal,
   wherein at least any one of the first lead terminal and the positive electrode tab, or the second lead terminal and the negative electrode tab are physically electrically connected to each other by using a squeeze pin, and
   wherein one of the first lead terminal and the positive electrode tab, or the second lead terminal and the negative electrode tab are stacked within the space of the squeeze pin;
   wherein the squeeze pin is a separate component from the first lead terminal, the positive electrode tab, the second lead terminal and the negative electrode tab,
   wherein the squeeze pin comprises:
      a supporting part having a flat shape;
      two pressurizing parts extending from opposite ends of the supporting part, each of said pressurizing parts bent to form the space between the supporting part and the pressurizing parts.

2. The secondary battery of claim 1, wherein the first lead terminal and the positive electrode tab are formed of different materials, and/or the second lead terminal and the negative electrode tab are formed of different materials.

3. The secondary battery of claim 1, further comprising a tab tape disposed about a part of the positive electrode tab and a tab tape disposed about a part of the negative electrode tab.

4. The secondary battery of claim 1, wherein the squeeze pin is formed of a metal material.

5. The secondary battery of claim 1, wherein the height of the space is the same as or greater than a thickness of the one of the stacked positive electrode tab and first lead terminal and the stacked negative electrode tab and second lead terminal.

6. The secondary battery of claim 1, wherein the pressurizing parts cover predetermined regions including both edges of the stacked positive electrode tab and first lead terminal or the stacked negative electrode tab and second lead terminal positioned in the space.

* * * * *